United States Patent
Sakashita et al.

(10) Patent No.: US 9,080,479 B2
(45) Date of Patent: Jul. 14, 2015

(54) FILTER ELEMENT

(71) Applicant: NGK Insulators, Ltd., Nagoya (JP)

(72) Inventors: Satoshi Sakashita, Nagoya (JP);
Toshihiro Hirakawa, Nagoya (JP)

(73) Assignee: NGK Insulators, Ltd., Nagoya ( * ) Notice: Subject to any disclaimer, the term of this patent is extended or adjusted under 35 U.S.C. 154(b) by 131 days.

(21) Appl. No.: 13/782,089

(22) Filed: Mar. 1, 2013

(65) Prior Publication Data

US 2013/0239532 A1     Sep. 19, 2013

(30) Foreign Application Priority Data

Mar. 14, 2012  (JP) ................................ 2012-057688

(51) Int. Cl.
| | |
|---|---|
| B01D 39/06 | (2006.01) |
| B01D 39/14 | (2006.01) |
| B01D 39/20 | (2006.01) |
| B01D 24/00 | (2006.01) |
| B01D 46/00 | (2006.01) |
| B01D 50/00 | (2006.01) |
| F01N 3/022 | (2006.01) |
| B01D 46/24 | (2006.01) |

(52) U.S. Cl.
CPC ............ F01N 3/0222 (2013.01); B01D 46/247 (2013.01); B01D 46/2474 (2013.01); B01D 2279/30 (2013.01); F01N 2330/34 (2013.01); Y02T 10/20 (2013.01)

(58) Field of Classification Search
CPC ............. B01D 46/10; B01D 2275/206; B01D 46/247; F01N 3/0222; F01N 2330/34
USPC ................... 55/529, 522–524; 422/169–172, 422/177–182
See application file for complete search history.

(56) References Cited

U.S. PATENT DOCUMENTS

| 4,417,908 A | 11/1983 | Pitcher, Jr. |
|---|---|---|
| 2005/0191461 A1 | 9/2005 | Kasai et al. |

(Continued)

FOREIGN PATENT DOCUMENTS

| FR | 2 946 892 A1 | 12/2010 |
|---|---|---|
| JP | 03-049608 B2 | 7/1991 |
| JP | 2005-270969 A1 | 10/2005 |

(Continued)

OTHER PUBLICATIONS

Extended European Search Report dated Jun. 10, 2013.

*Primary Examiner* — Amber Orlando
(74) *Attorney, Agent, or Firm* — Burr & Brown, PLLC (57) ABSTRACT

A filter element including inflow passages and outflow passages and, a total cross-sectional area of all the inflow passages is larger than a total cross-sectional area of all the outflow passages, and the number of the inflow passages is larger than the number of the outflow passages, a cross section of the filter element is formed by the large number of outflow passages each having a regular hexagonal shape and the large number of inflow passages each having a modified hexagonal shape, the large number of regular hexagonal outflow passages are formed by first hexagonal passages, and second hexagonal passages each having a cross-sectional area smaller than that of each of the first hexagonal passages, an outer peripheral side of each of the first hexagonal passages and the second hexagonal passages is surrounded with six modified hexagonal inflow passages via the partition walls.

5 Claims, 4 Drawing Sheets

(56) References Cited

U.S. PATENT DOCUMENTS

| | | |
|---|---|---|
| 2009/0205301 A1 | 8/2009 | Komori et al. |
| 2010/0269697 A1 | 10/2010 | Vincent et al. |

FOREIGN PATENT DOCUMENTS

| | | |
|---|---|---|
| JP | 2009-537741 A1 | 10/2009 |
| JP | 2011-509816 A1 | 3/2011 |
| WO | 2008/066795 A2 | 6/2008 |

FILTER ELEMENT

CROSS-REFERENCE TO RELATED APPLICATION

The present application is an application based on JP-2012-057688 filed on Mar. 14, 2012 with the Japanese Patent Office, the entire contents of which are incorporated herein by reference.

BACKGROUND OF THE INVENTION

1. Field of the Invention

The present invention relates to a filter element which can suitably be used for treatment of an exhaust gas from an internal combustion engine, especially a diesel engine.

2. Description of Related Art

An exhaust gas discharged from an internal combustion engine, especially a diesel engine, includes a particulate matter (PM) and ash. To remove the PM and ash from the exhaust gas of the diesel engine or the like, a diesel particulate filter (DPF) is used. The DPF is a filter having a honeycomb structure constituted of a large number of mutually parallel fluid through channels partitioned by porous partition walls. Adjacent inlet and outlet portions of the fluid through channels are alternately plugged, and the partition walls of the fluid through channels are used as filter surfaces of the exhaust gas. When the DPF is used for a long period of time, a predetermined amount or more of the PM and ash is deposited on an inner part of the filter, so that a pressure loss increases, an ability to remove the PM and ash deteriorates, and a function of the filter cannot be exerted. Therefore, it becomes necessary to perform a regeneration treatment of the DPF. The PM deposited on the DPF can be removed by heating/burning at regeneration, but the ash cannot be removed by the burning at the regeneration, and substantially has to be deposited on inlet cells of the DPF.

The ash is deposited on the DPF mainly in order from terminal ends of the inlet cells to an inlet side of the DPF in a cell direction, but as an amount of the ash to be deposited increases, a filter area substantially decreases, which results in rapid increase of the pressure loss. To avoid the increase of the pressure loss, it has been suggested that an open area of each of the inlet cells is increased as compared with outlet cells, or a plugging pattern is contrived to increase the number of the inlet cells, thereby increasing a capacity of each inlet cell, so that a larger amount of ash can be deposited (see Patent Documents 1 and 2).

On the other hand, for the purpose of removing the deposited PM to promote the regeneration of the DPF, the DPF is usually coated with an oxidation catalyst. When each cell is formed into an obtuse cross-sectional shape such as a hexagonal cross-sectional shape as in technologies disclosed in Patent Documents 2 and 3, an inner portion of the cell can be evenly coated with the catalyst. In consequence, an expensive catalyst containing a large amount of noble metal can be saved, as compared with cells each having an intersecting point of 90° or less, for example, quadrangular cells in which the catalyst is unevenly deposited on each intersecting portion with each partition wall and in which a large amount of substantially unused catalyst remains.

Moreover, in FIG. 11 of Patent Document 2, there is disclosed a honeycomb filter for the purpose of achieving both of enhancement of catalyst coat properties of the cells each having the hexagonal cross-sectional shape and increase of a capacity for the ash to be deposited. That is, according to the honeycomb filter disclosed in FIG. 11 of Patent Document 2, six inlet cells are provided around one outlet cell, to set a total capacity of the inlet cells of a honeycomb carrier to be twice as much as that of the outlet cells, thereby increasing the capacity for the ash to be deposited.

However, in Patent Document 2, partition walls shared by the inlet cells are present, and hence the number of partition walls which effectively collect the PM and the ash substantially decreases. That is, there has been the problem that an effective GSA (a value obtained by dividing, by a volume of a carrier, a total surface area of the partition walls shared by the inlet cells and outlet cells) decreases and a pressure loss increases.

Furthermore, according to Patent Documents 3 and 4, to increase an effective GSA, inlet cells are deformed. That is, there is disclosed a filter structure where a length of a partition wall shared by inlet cells is shortened to increase the effective GSA.

However, in the filter structures disclosed in Patent Documents 3 and 4, the increase of the effective GSA results in decrease of a total volume of the inlet cells, which has caused the problem that a capacity for ash to be deposited decreases as compared with the technology of Patent Document 2.

[Patent Document 1] JP-2005-270969-A
[Patent Document 2] JP-03-49608-B
[Patent Document 3] JP-2009-537741-T
[Patent Document 4] JP-2011-509816-T

SUMMARY OF THE INVENTION

The present invention has been developed in view of such problems of the conventional technologies, and an object thereof is to provide a filter element which can increase a capacity for ash to be deposited while suppressing decrease of an effective GSA and suppressing increase of a pressure loss and which additionally can lower a regeneration temperature by enhancing a regeneration limit and enhancing ignitability at regeneration.

That is, according to the present invention, there is provided the following filter element.

[1] A filter element which filters an exhaust gas from an internal combustion engine, comprising: an inflow surface and an outflow surface; and a large number of inflow passages and a large number of outflow passages, the inflow passages and the outflow passages being partitioned by partition walls made of a porous material, wherein a total cross-sectional area of all the inflow passages is larger than a total cross-sectional area of all the outflow passages, and the number of the inflow passages is larger than the number of the outflow passages, a cross section of the filter element is formed by the large number of outflow passages each having a regular hexagonal shape and the large number of inflow passages each having a modified hexagonal shape, the large number of regular hexagonal outflow passages are formed by first hexagonal passages, and second hexagonal passages each having a cross-sectional area smaller than that of each of the first hexagonal passages, an outer peripheral side of each of the first hexagonal passages and the second hexagonal passages is surrounded with six modified hexagonal inflow passages via the partition walls, and the first hexagonal passages and the second hexagonal passages are regularly arranged.

[2] The filter element according to the above [1], wherein the cross section of each of the modified hexagonal inflow passages includes two sides a which share the partition walls with the first hexagonal passages, and one side b which shares the partition wall with the second hexagonal passage, and the cross section is formed by alternately arranging these three sides (a and b) and three sides (c and d) which share the partition walls with the adjacent modified hexagonal inflow passages.

[3] The filter element according to the above [1] or [2], wherein a ratio (Y/X) of a cross-sectional area (Y) of each of the second hexagonal passages to a cross-sectional area (X) of each of the first hexagonal passages is 0.35 or more and 0.90 or less.

According to the filter element of the present invention, there can be produced remarkable effects that it is possible to increase a capacity for ash to be deposited while suppressing decrease of an effective GSA and suppressing increase of a pressure loss and that it is possible to lower a regeneration temperature by enhancing a regeneration limit and enhancing ignitability at regeneration.

DETAILED DESCRIPTION OF THE INVENTION

DETAILED DESCRIPTION OF THE INVENTION

Hereinafter, an embodiment of the present invention will be described, but it should be understood that the present invention is not limited to the following embodiment and that change, improvement or the like suitably added to the following embodiment on the basis of ordinary knowledge of a person skilled in the art falls in the scope of the present invention without departing from the scope of the present invention.

Figure 1:
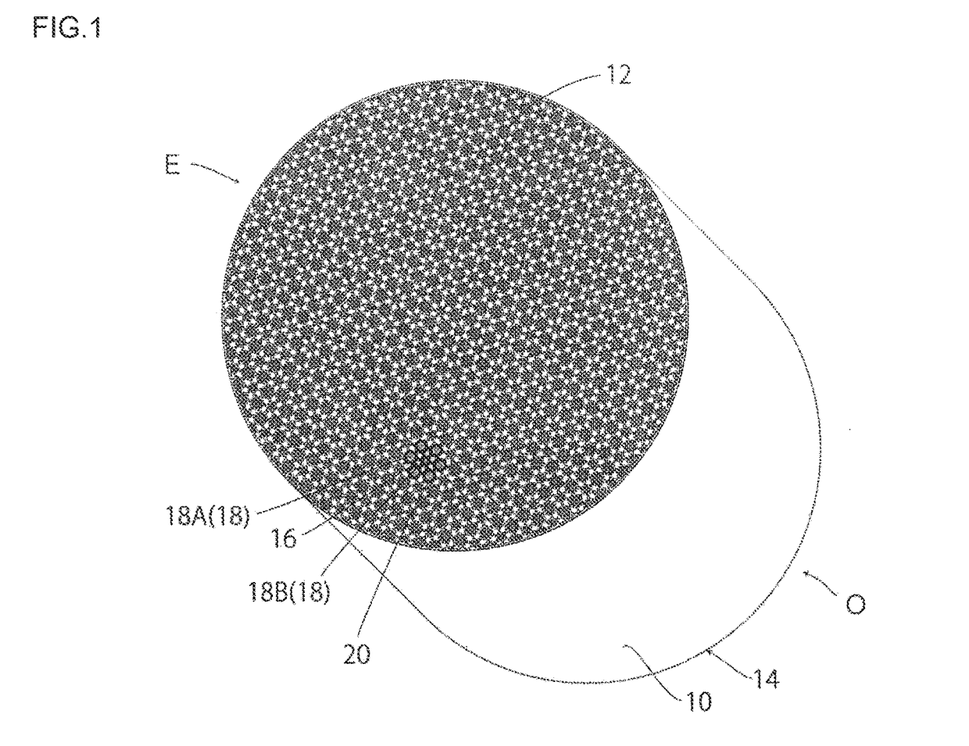
FIG. 1 is a perspective view showing one embodiment of a filter element according to the present invention.
Figure 2:
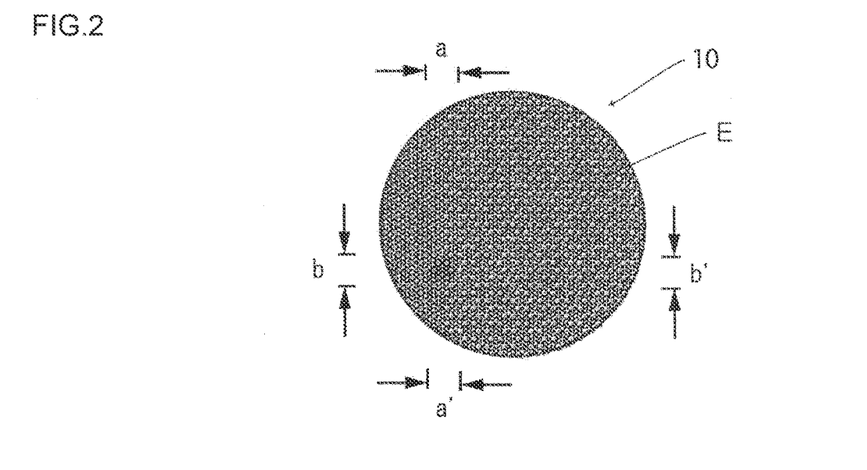
FIG. 2 is a side view of the one embodiment of the filter element according to the present invention, showing one end surface which becomes an inflow side (the inlet side) of an exhaust gas.
Figure 3:
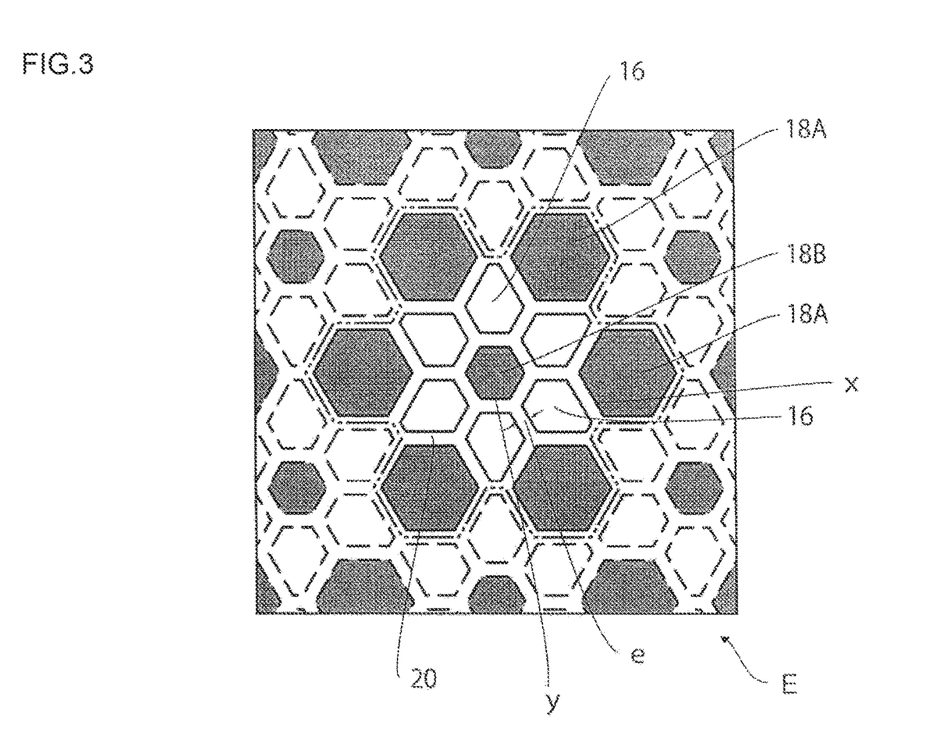
FIG. 3 is an enlarged view of a portion taken along the a-a' and b-b' lines of FIG. 2, in which a portion surrounded with a two-dot chain line is a portion shown by thick lines in FIG. 1.

FIG. 1 is a perspective view showing one embodiment of a filter element according to the present invention. Moreover, FIG. 2 is a side view of the one embodiment of the filter element according to the present invention, showing one end surface which becomes an inflow side (the inlet side) of an exhaust gas. FIG. 3 is an enlarged view of a portion taken along the a-a' and b-b' lines of FIG. 2, in which a portion surrounded with a two-dot chain line is a portion shown by thick lines in FIG. 1. In FIG. 1 to FIG. 3, E denotes an exhaust gas inflow-side end surface. 10 denotes the filter element according to the one embodiment of the present invention, which, similarly to a heretofore known filter element, includes an inflow surface 12 and an outflow surface 14, and a large number of inflow passages (inlet cells) 16 and a large number of outflow passages (outlet cells) 18 extending from the inflow surface 12 to the outflow surface 14. The inflow passages 16 and outflow passages 18 are partitioned by partition walls 20 made of a porous material, respectively. Moreover, the outflow passages (the outlet cells) 18 are plugged in the gas inflow-side end surface E. On the other hand, the inflow passages (the inlet cells) 16 are plugged in an exhaust gas outflow-side end surface O.

The filter element 10 has a constitution where a total cross-sectional area of all the inflow passages 16 (the gas inflow-side open area) is larger than a total cross-sectional area of all the outflow passages 18 (the gas outflow-side open area). Moreover, the filter element has a constitution where the number of the inflow passages 16 is larger than the number of the outflow passages 18.

The filter element according to the present invention has noticeable characteristics that a cross section of the filter element 10 is formed by the large number of outflow passages 18 each having a regular hexagonal shape and the large number of inflow passages 16 each having a modified hexagonal shape. Moreover, the large number of regular hexagonal outflow passages 18 are formed by two types of hexagonal passages, i.e., first hexagonal passages (also referred to as the large regular hexagonal cells) 18A each having a large cross-sectional area, and second hexagonal passages (also referred to as the small regular hexagonal cells) 18B each having a cross-sectional area smaller than that of each of the first hexagonal passages 18A. The first hexagonal passage 18A is a passage (the cell) having a cross section formed into a regular hexagonal shape by six sides x having the same length. The second hexagonal passage 18B is a passage (the cell) having a cross section formed into a regular hexagonal shape by six sides y having the same length. The large number of first hexagonal passages 18A have the same cross-sectional shape, and the large number of second hexagonal passages 18B also have the same cross-sectional shape.

Moreover, an outer peripheral side of each of the first hexagonal passages (the large regular hexagonal cells) 18A and the second hexagonal passages (the small regular hexagonal cells) 18B is surrounded with six modified hexagonal (cross-sectional shape) inflow passages (also referred to as the modified hexagonal cells) 16 via the partition walls 20. Here, the modified hexagonal inflow passages 16 have the same cross-sectional shape. Additionally, as to each of the cross-sectional shapes of the first hexagonal passage 18A, second hexagonal passage 18B and modified hexagonal inflow passage 16, each corner portion of the cross-sectional shape does not have to be formed at an acute angle, and may be formed into a round shape if necessary. Such a round shape facilitates manufacturing, and contributes to alleviation of stress concentration. Moreover, the partition walls 20 have the same thickness e in the one filter element 10. Furthermore, the first hexagonal passages (the large regular hexagonal cells) 18A and the second hexagonal passages (the small regular hexagonal cells) 18B are regularly arranged together with the modified hexagonal inflow passages (the modified hexagonal cells) 16.

Figure 4:
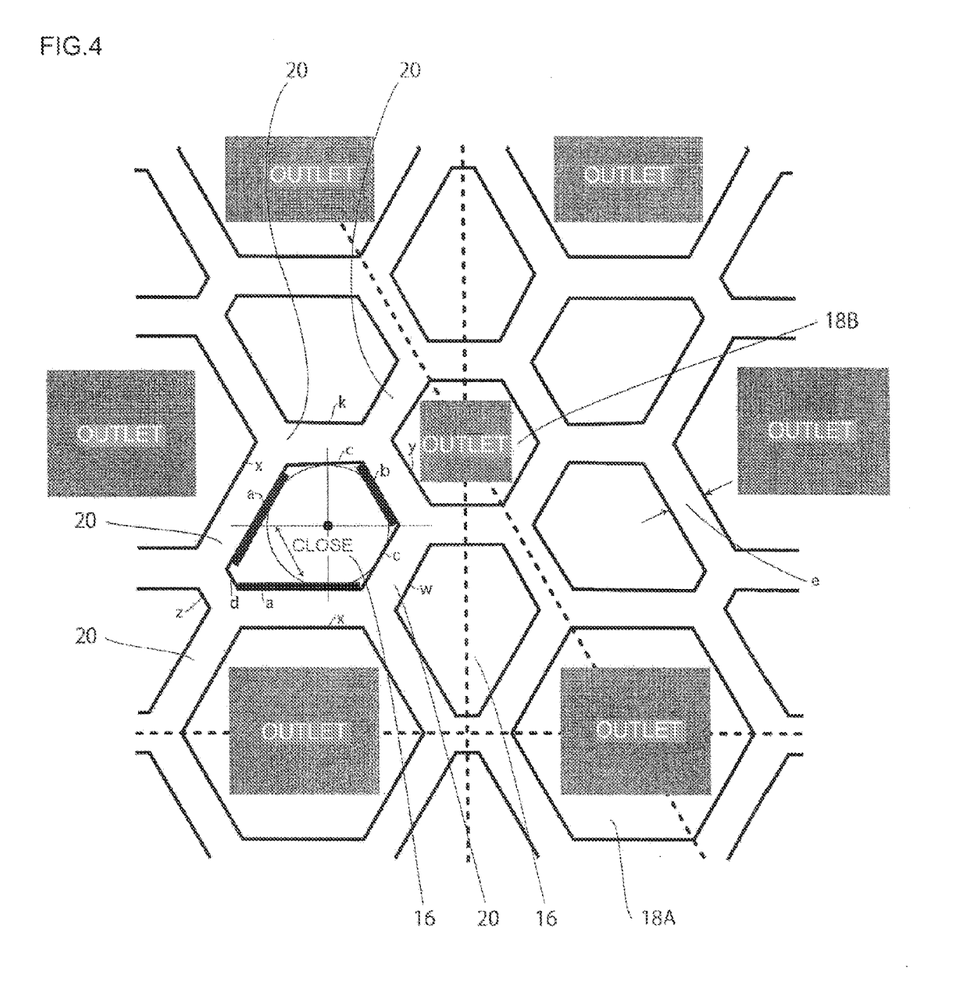
FIG. 4 is a partially enlarged view of the exhaust gas inlet-side end surface of the filter element according to the present invention.

FIG. 4 shows an embodiment where six modified hexagonal cells 16 are arranged around each of the large regular hexagonal cells 18A and the small regular hexagonal cells 18B. In the cross section of the modified hexagonal cell 16, one side b of the cell is disposed at such a position as to face one side y of the small regular hexagonal cell 18B, and is formed with the same length as that of the one side y of the small regular hexagonal cell 18B. Each of two longest sides a among the remaining sides of the modified hexagonal cell 16 is formed with the same length as that of side x of each of the large regular hexagonal cells 18A which are adjacent to the modified hexagonal cell via the partition walls 20, respectively. Each of the three remaining sides (two sides c and one side d) of the modified hexagonal cell 16 is formed with the same length as that of each of sides (k, w and z) of the modified hexagonal cells 16 which are adjacent to the modified hexagonal cell via the partition walls 20, respectively. In other words, the small regular hexagonal cell 18B which is one of the outflow passages (the outlet cells) shares the partition walls 20 with six modified hexagonal cells 16 as the inflow passages (the inlet cells) with which the small regular hexagonal cell is surrounded. Moreover, the large regular hexagonal cell 18A which is one of the outflow passages (the outlet cells) also shares the partition walls 20 with six modified hexagonal cells 16 as the inflow passages (the inlet cells) with which the large regular hexagonal cell is surrounded.

As above, the cross section of the modified hexagonal cell 16 which is one of the inlet cells has the two sides a (the longest) which share the partition walls 20 with the large regular hexagonal cells 18A, and the one side b which shares the partition wall 20 with the small regular hexagonal cell 18B. The sides a are the longest among the sides constituting the cross section of the modified hexagonal cell 16. The cross section of the modified hexagonal cell 16 is formed by alternately arranging these three sides (a and b) in total and the three sides (c and d) which share the partition walls 20 with the adjacent modified hexagonal cells 16.

Since the filter element of the present invention has such a constitution, owing to a relation in size between the large regular hexagonal cell 18A and the small regular hexagonal cell 18B which are the outlet cells, a density of a PM to be deposited on the sides a which are partition wall surfaces of the modified hexagonal cell 16 as one of the inlet cells increases, and a density of a PM to be deposited on the side b which is a partition wall surface relatively decreases. Furthermore, a distance between the two sides a is comparatively short as compared with a distance between each of the sides a and the side b. Therefore, in each of the cell, the PM is unevenly deposited. In other words, an amount of the PM to be deposited on the two sides a which are the surfaces of the partition wall 20 increases. Then, the PM deposited on the two sides a as the surfaces of the partition wall 20 which have a large amount of the PM to be deposited thereon is easily first burnt. Consequently, according to the filter element of the present invention, as compared with quadrangular cells each having a quadrangular cross-sectional shape or as compared with a case where the PM is evenly deposited on the respective sides of the partition wall 20 in each of the cells as in the conventional technologies disclosed in Patent Documents 2 to 4, the PM is easily ignited, and a regeneration temperature can be lowered. In consequence, a fuel efficiency of a vehicle can be enhanced.

Furthermore, the PM deposited on the two sides a which are the surfaces of the partition wall 20 starts to be burnt, and then the PM deposited on the side b which is the surface of the partition wall starts to be burnt, so that a burning time difference is made small in the cell. Therefore, as compared with a case where the PMs in the inlet cells are simultaneously burnt as in the conventional technologies, the regeneration temperature can be lowered. In consequence, a limit amount of the PM to be deposited can be increased, and the fuel efficiency of the vehicle can be enhanced.

In the filter element according to the present invention, a ratio (Y/X) of a cross-sectional area (Y) of each of the second hexagonal passages 18B to a cross-sectional area (X) of each of the first hexagonal passages 18A is preferably 0.35 or more and 0.90 or less, and further preferably 0.40 or more and 0.80 or less. When the ratio (Y/X) is out of the above range, one of effects of suppression of decrease of an effective GSA, suppression of increase of a pressure loss, enhancement of a capacity for ash to be deposited, and lowering of a PM filter element regeneration temperature by increase of a regeneration limit and enhancement of ignitability of the PM at the regeneration is slightly decreased sometimes.

In the filter element according to the present invention, besides the above-mentioned characteristics of constituent requirements, it is possible to apply a structure, constituent materials and a manufacturing method which have heretofore been known. For example, there is not any special restriction on materials constituting a base material of the filter element, and cordierite, silicon carbide (SiC), zirconia, silicon nitride ($Si_3N_4$), aluminum titanate and the like can be used. As a plugging material, a material similar to the base material can be used. Moreover, as the plugging material, for the purpose of decreasing a thermal expansion difference between the base material of the filter element and the plugging material, the same material as the base material of the filter element is preferably used.

A thickness of each of the partition walls (the rib thickness) is preferably from 100 to 2000 μm (from 0.1 to 2.0 mm), more preferably from 200 to 1000 μm, and further preferably from 300 to 700 μm. When the thickness of the partition wall is smaller than 100 μm, a strength runs short, and a resistance to heat shock decreases sometimes. On the other hand, when the thickness of the partition wall is in excess of 2000 μm, the pressure loss excessively increases sometimes.

A cell density is preferably from 20 to 600 cpsi (from 3.1 to 93 cells/$cm^2$), more preferably from 50 to 400 cpsi (from 7.8 to 62 cells/$cm^2$), and further preferably from 100 to 300 cpsi (from 15.5 to 46.5 cells/$cm^2$). When the cell density is smaller than 20 cpsi (3.1 cells/$cm^2$), an effective area of the filter runs short, and a PM collection efficiency is deteriorated sometimes. On the other hand, when the cell density is in excess of 600 cpsi (93 cells/$cm^2$), the pressure loss excessively increases sometimes. Additionally, "cpsi" is an abbreviation for "cells per square inch", and is a unit indicating the number of the cells per square inch. For example, 10 cpsi is about 1.55 cells/$cm^2$.

A porosity of each of the partition walls is preferably from 25 to 75%, more preferably from 30 to 65%, and further preferably from 35 to 65%. When the porosity is smaller than 25%, the pressure loss excessively increases sometimes. On the other hand, when the porosity of the partition wall is in excess of 75%, the strength of the filter element excessively decreases sometimes.

An average pore diameter (the pore diameters) of the partition walls is preferably from 6 to 35 μm, more preferably from 7 to 30 μm, and further preferably from 7 to 25 μm. When the average pore diameter of the partition walls is smaller than 6 μm, the pressure loss excessively increases sometimes. On the other hand, when the average pore diameter is in excess of 35 μm, the strength of the filter element excessively decreases sometimes.

There is not any special restriction on a shape of the filter element, and examples of the shape include a tubular shape in which end surfaces are circular (the cylindrical shape), a tubular shape in which end surfaces are oval, and a tubular shape in which end surfaces are polygonal (quadrangular, pentangular, hexagonal, heptagonal, or octagonal).

As a method of preparing the filter element, a heretofore known method can be used. As one specific example of the method, first, to the above-mentioned material, there are added a binder such as methylcellulose, hydroxypropoxyl cellulose, hydroxyethyl cellulose, carboxymethylcellulose or polyvinyl alcohol, a pore former, a surfactant, water as a solvent, and the like, to obtain a kneaded material having plasticity. Next, this kneaded material is extruded to form a predetermined honeycomb shape. Next, an obtained honeycomb-like formed body (the formed honeycomb body) is dried by microwaves, hot air or the like, and is then fired. The firing may be performed prior to forming plugged portions in the cells, or may be performed simultaneously with the firing of the plugged portions after forming the plugged portions in the cells.

As a method of forming the plugged portions in the passages (the cells), a heretofore known method can be used. As one specific example of the method, first, a sheet is attached to an end surface of the filter element prepared by the above-mentioned method. Next, holes are made at positions of this sheet corresponding to the cells to be provided with the plugged portions. Next, the end surface of the filter element to which this sheet is attached is immersed into a plugging slurry as a slurried constituent material of the plugging material, and end portions of the cells to be provided with the plugged portions are filled with the plugging slurry through the holes made in the sheet. The plugging slurry filled in this manner is dried, and then fired to harden, thereby forming the plugged portions.

EXAMPLES

Hereinafter, the present invention will specifically be described on the basis of examples and comparative examples, but the present invention is not limited to these examples.

Examples 1 to 5 and Comparative Examples 1 to 4

To a cordierite constituting material (a mixture of predetermined amounts of talc, alumina and kaolin), a binder, a dispersant, water and the like were added and kneaded, to obtain a kneaded material to be formed. This kneaded material was used to obtain a honeycomb-like formed body (the formed honeycomb body) by extrusion-forming, and this body was dried, and then fired at a predetermined temperature for a predetermined period of time. Next, plugged portions were formed in end surfaces of the body in patterns shown in FIGS. 1 to 3, to prepare filter elements of various structures shown in Table 1.

Figure 5:
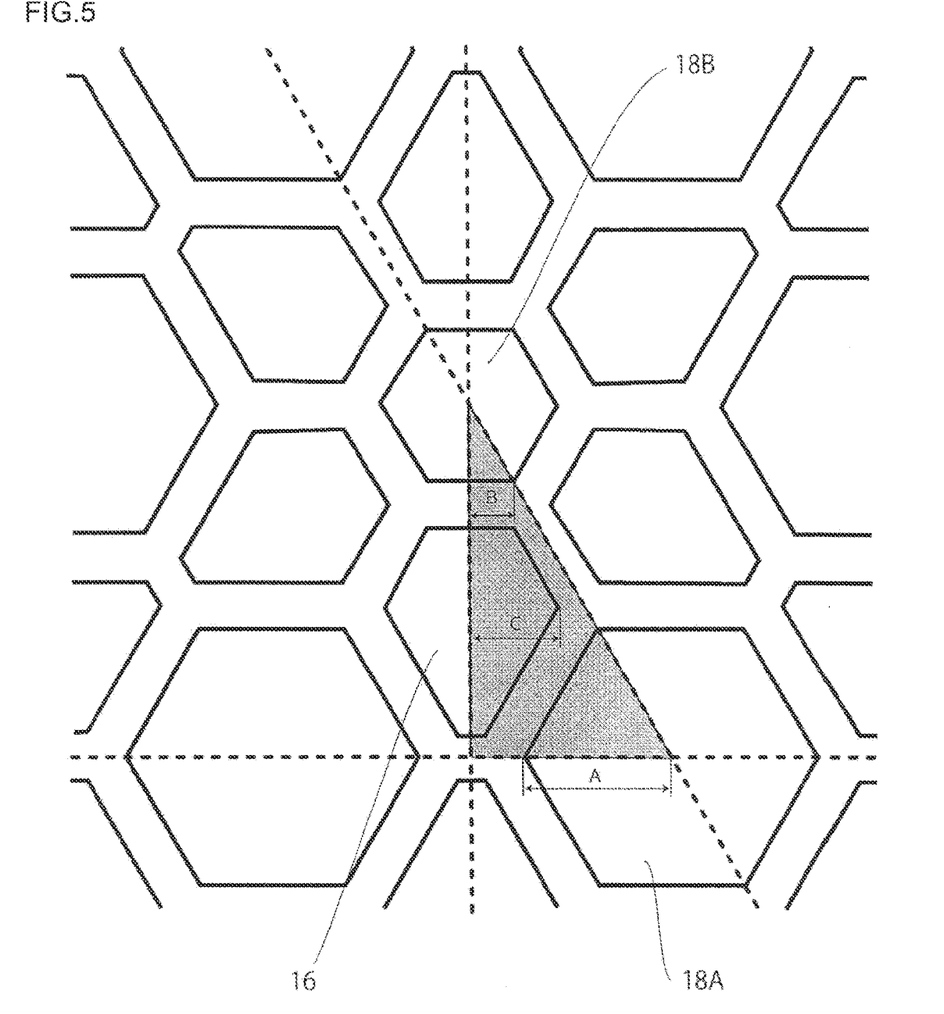
FIG. 5 is a partially enlarged explanatory view showing dimensions A, B and C of two types of large and small regular hexagonal outflow passages and a modified hexagonal inflow passage in the filter element according to the present invention.

As a cell structure of each filter element, a thickness of a partition wall (the rib thickness) was 12 mil (0.3 mm), a cell density (the number of the cells) was 300 cpsi (46.5 cells/cm$^2$), and a plugging depth was 4 mm. An end surface shape of the filter element was circular, and as dimensions of the filter element, a diameter was 5.66 inches (143.8 mm), a length was 6 inches (152.4 mm), and an area of an end surface was 16232 mm$^2$. Moreover, as to the filter elements of the respective examples and comparative examples, there are shown, in Table 1, dimensions A, B and C of a large regular hexagonal cell 18A, a small regular hexagonal cell 18B and a modified hexagonal cell (see FIG. 5), a cross-sectional area (X) of the large regular hexagonal cell 18A, a cross-sectional area (Y) of the small regular hexagonal cell 18B, a ratio (Y/X) between the areas, and a total area of inlet cells per honeycomb carrier constituting the filter element. Additionally, the filter element of Comparative Example 1 corresponds to the embodiment shown in FIG. 3 of JP-2009-537741-T (Patent Document 3), and the filter element of Comparative Example 2 is a filter element in which a cross-sectional shape of each cell is a regular hexagonal shape.

(Evaluation)

1. Ash Capacity Ratio:

An ash capacity (corresponding to a total area of inlet cells) of the filter element was evaluated by use of an ash capacity ratio of Comparative Example 1 as a reference (1.00), and as to the filter elements of the other examples and comparative examples, a case where the ash capacity ratio increased as much as 1.5% or more was good, a case where the ratio increased as much as 3.0% or more was excellent, and a case where the increase of the ratio was smaller than 1.5% was bad. Results are shown in Table 2.

2. Effective GSA

An effective GSA is a value obtained by dividing a total surface area of partition walls shared by the inlet cells and outlet cells by a volume of the filter element (the carrier). The effective GSA was evaluated by use of a numeric value of the effective GSA of Comparative Example 1 as a reference, and effective GSA ratios of the filter elements of the other examples and comparative examples were obtained. Results are shown in Table 2.

3. Pressure Loss

A pressure loss was evaluated on the basis of the effective GSA ratio of the filter element. When the effective GSA ratio of Comparative Example 1 was used as a reference (1.00), a case where decrease of the effective GSA ratio of the filter element in the other examples and comparative examples was smaller than 10% was excellent, a case where the decrease was 10% or more and smaller than 20% was good, and a case where the decrease was 20% or more was bad. Results are shown in Table 2.

4. PM Ignition Temperature and DPF Highest Temperature 5 g/L of soot was deposited on the filter element (the DPF) of each of various structures shown in Table 1, and then regeneration (the burning of the PM) was performed. In this case, an ignition temperature and the highest temperature in the DPF were confirmed. First, a ceramic non-thermally-expandable mat was wound as a holding material around an outer periphery of the obtained filter element (DPF), and the filter element was pushed into a canning member made of stainless steel (SUS409), to obtain a canning structure. Afterward, a combustion gas including the PM generated by burning a diesel fuel (the light oil) was allowed to flow into one end surface (the inflow surface) of the DPF and flow out of the other end surface (the outflow surface), thereby depositing the PM in the DPF. Afterward, the DPF was once cooled to room temperature (25° C.), and then the combustion gas of 680° C. was allowed to flow into the inflow surface of the DPF. When the PM was burnt to decrease the pressure loss of the DPF, a flow rate of the combustion gas was decreased to rapidly burn the PM. In this case, the PM ignition temperature and the highest temperature in the DPF were measured. The PM ignition temperature was evaluated by use of the measurement result of Comparative Example 1 as a reference. A case where drop of the ignition temperature was smaller than 5° C. was bad, a case where the drop was 5° C. or more and smaller than 10° C. was good, and a case where the drop was 10° C. or more was excellent. As to the highest temperature in the DPF, the measurement result of Comparative Example 1 was used as a reference. A case where drop of the highest temperature was smaller than 10° C. was bad, a case where the drop was 10° C. or more and smaller than 20° C. was good, and a case where the drop was 20° C. or more was excellent. The results are shown in Table 2.

TABLE 1

|  | Rib thickness (mm) | Cell number (cells/cm²) | Large regular hexagonal cell: A (mm) | Small regular hexagonal cell: B (mm) | Modified hexagonal cell: C (mm) | Cross-sectional area of each large regular hexagonal cell: X (mm²) | Cross-sectional area of each small regular hexagonal cell: Y (mm²) | Y/X |
|---|---|---|---|---|---|---|---|---|
| Comparative Example 1 | 0.3 | 46.5 | 0.850 | 0.425 | 0.675 | 1.88 | 1.88 | 1.00 |
| Comparative Example 2 | 0.3 | 46.5 | 0.734 | 0.367 | 0.734 | 1.40 | 1.40 | 1.00 |
| Comparative Example 3 | 0.3 | 46.5 | 0.850 | 0.410 | 0.675 | 1.88 | 1.75 | 0.93 |
| Example 1 | 0.3 | 46.5 | 0.850 | 0.400 | 0.675 | 1.88 | 1.66 | 0.89 |
| Example 2 | 0.3 | 46.5 | 0.850 | 0.380 | 0.675 | 1.88 | 1.50 | 0.80 |
| Example 3 | 0.3 | 46.5 | 0.850 | 0.350 | 0.675 | 1.88 | 1.27 | 0.68 |
| Example 4 | 0.3 | 46.5 | 0.850 | 0.300 | 0.675 | 1.88 | 0.94 | 0.50 |
| Example 5 | 0.3 | 46.5 | 0.850 | 0.270 | 0.675 | 1.88 | 0.76 | 0.40 |
| Comparative Example 4 | 0.3 | 46.5 | 0.850 | 0.200 | 0.675 | 1.88 | 0.42 | 0.22 |

TABLE 2

|  | Total area of inlet cells per carrier (mm²) | Ash capacity ratio | Effective GSA (mm²/mm³) | Effective GSA ratio | Ash capacity | Pressure loss | PM ignition temperature | DPF highest temperature |
|---|---|---|---|---|---|---|---|---|
| Comparative Example 1 | 4723.90 | 1.00 | 7.71 | 1.00 | — | — | — | — |
| Comparative Example 2 | 5742.77 | 1.22 | 6.65 | 0.86 | excellent | bad | bad | bad |
| Comparative Example 3 | 4842.99 | 1.03 | 7.62 | 0.99 | bad | excellent | bad | bad |
| Example 1 | 4895.91 | 1.04 | 7.55 | 0.98 | good | excellent | good | good |
| Example 2 | 5015.00 | 1.06 | 7.43 | 0.96 | excellent | excellent | excellent | excellent |
| Example 3 | 5160.56 | 1.09 | 7.25 | 0.94 | excellent | excellent | excellent | excellent |
| Example 4 | 5398.74 | 1.14 | 6.95 | 0.90 | excellent | excellent | excellent | excellent |
| Example 5 | 5517.83 | 1.17 | 6.77 | 0.88 | excellent | good | excellent | excellent |
| Comparative Example 4 | 5756.01 | 1.22 | 6.35 | 0.82 | excellent | bad | excellent | excellent |

(Consideration)

As shown in Table 1 and Table 2, according to the filter element of the present invention, a capacity for ash to be deposited can be increased while suppressing the decrease of the effective GSA to a predetermined degree and suppressing the increase of the pressure loss. Furthermore, it is seen that according to the filter element of the present invention, the PM ignition temperature can be lowered as compared with the conventional technologies, to lower the PM filter element regeneration temperature, and additionally, the highest temperature at the regeneration can be lowered to enhance a regeneration limit.

A filter element of the present invention can suitably be used as a filter to collect a particulate matter (PM) such as soot and ash discharged from an internal combustion engine such as a diesel engine or a gasoline engine.

DESCRIPTION OF REFERENCE MARKS

10: filter element, 12: inflow surface, 14: outflow surface, 16: inflow passage (modified hexagonal cell), 18: outflow passage, 18A: first hexagonal passage (large regular hexagonal cell), 18B: second hexagonal passage (small regular hexagonal cell), 20: partition wall, E: exhaust gas inflow-side end surface, and O: exhaust gas outflow-side end surface.

What is claimed is:

1. A filter element which filters an exhaust gas from an internal combustion engine, comprising: an inflow surface and an outflow surface; and a large number of inflow passages and a large number of outflow passages, the inflow passages and the outflow passages being partitioned by partition walls made of a porous material,
   wherein a total cross-sectional area of all the inflow passages is larger than a total cross-sectional area of all the outflow passages, and the number of the inflow passages is larger than the number of the outflow passages,
   a cross section of the filter element is formed by the large number of outflow passages each having a regular hexagonal shape and the large number of inflow passages each having a modified hexagonal shape,
   the large number of regular hexagonal outflow passages are formed by first hexagonal passages, and second hexagonal passages each having a cross-sectional area smaller than that of each of the first hexagonal passages,
   an outer peripheral side of each of the first hexagonal passages and the second hexagonal passages is surrounded with six modified hexagonal inflow passages via the partition walls, and
   the first hexagonal passages and the second hexagonal passages are regularly arranged.

2. The filter element according to claim 1,
   wherein the cross section of each of the modified hexagonal inflow passages includes two sides a which share the partition walls with the first hexagonal passages, and one side b which shares the partition wall with the second hexagonal passage, and the cross section is formed by alternately arranging a side from the group consisting of the two sides a and the one side b, and a side from the group consisting of two sides c and one side d, each side c and side d sharing a partition wall with an adjacent modified :hexagonal inflow passage.

3. The filter element according to claim 1, wherein a ratio (Y/X) of a cross-sectional area (Y) of each of the second hexagonal passages to a cross-sectional area (X) of each of the first hexagonal passages is 0.35 or more and 0.90 or less.

4. The filter element according to claim 2, wherein a ratio (Y/X) of a cross-sectional area (Y) of each of the second hexagonal passages to a cross-sectional area (X) of each of the first hexagonal passages is 0.35 or more and 0.90 or less.

5. The filter element according to claim 2, wherein side a is longer than side b.

* * * * *